United States Patent Office 3,485,794
Patented Dec. 23, 1969

3,485,794
STABILIZATION OF POLYMERS WITH
ORGANOTIN COMPOUNDS
Carl R. Gloskey, Stirling, N.J., assignor to M & T
Chemicals Inc., New York, N.Y., a corporation of
Delaware
No Drawing. Continuation-in-part of application Ser. No.
586,312, May 31, 1966. This application Jan. 21, 1969,
Ser. No. 792,859
Int. Cl. C08f 37/02, 45/62
U.S. Cl. 260—45.75    4 Claims

ABSTRACT OF THE DISCLOSURE

A novel heat and light stable halogen-containing organic polymer composition comprising a halogen-containing polymer selected from the group consisting of homopolymers of vinyl chloride or vinylidene chloride, and copolymers of vinyl chloride and vinylidene chloride with each other or with other ethylenically unsaturated monomers and a stabilizing composition prepared by the reaction of $R_aSnCl_{b+1}$ with substantially equimolar amounts of R'R"SnO and $HSCH_2CH_2COOH$, wherein R, R' and R" are each selected from the group consisting of alkyl, alkenyl, alkynyl, cycloalkyl, aryl, aralkyl, and alkaryl, $a$ is less than 3, and $a+b$ equals 3.

---

This invention relates to resin compositions stabilized with organotin mercapto compounds. This is a continuation-in-part of application Ser. No. 586,312 filed on May 31, 1966, now abandoned, divisional application of Ser. No. 271,590 filed Apr. 9, 1963 now U.S. Patent 3,293,273.

Various organotin mercaptide type compounds have been mixed with chlorine-containing resins including polyvinyl chloride type resins to improve the properties of these resins. These compounds have been found to be particularly effective in increasing the stability of the noted resins against deterioration by heat and light. Although many such compounds have been used as heat and light stabilizers, they are commonly characterized by defects. For example, many of these compounds are highly polymeric in nature and may therefore be insoluble or not readily soluble in commonly used organic solvents such as toluene. Other stabilizers may be characterized by their undesirably high odor which renders them less than fully satisfactory for many uses. Some stabilizers may be either heat or light stabilizers; but there is no presently available stabilizer which is believed to possess outstanding ability to simultaneously stabilize against deterioration from both heat and light.

It is an object of this invention to provide a novel organotin mercapto stabilizer compound characterized by its ability to effect stabilization of chlorine-containing resins against deterioration by heat and light. Other objects will be apparent to those skilled in the art on inspection of the following description.

In accordance with certain of its aspects, the novel organotin compound of this invention is prepared by reaction of substantially equimolar amounts of R'R"SnO and β-mercaptopropionic acid $HSCH_2CH_2COOH$, together with $R_aSnCl_{b+1}$ in amount of 0.05 to 0.20 moles per mole of $HSCH_2CH_2COOH$ wherein R, R', and R" are each selected from the group consisting of alkyl, alkenyl, alkynyl, cycloalkyl, aryl, aralkyl, and alkaryl, $a$ is less than 3, and $a+b$ equals 3. The so-prepared product may have the formula

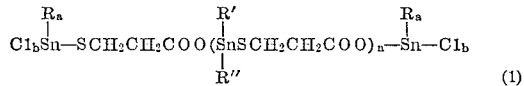

In practice of this invention, the compound R'R"SnO may be a compound wherein R' and R", which may be different but which preferably are the same, may be hydrocarbon, i.e. selected from the group consisting of alkyl, alkenyl, alkynyl, cycloalkyl, aryl, aralkyl, and alkaryl, including such moieties when inertly substituted. When R' and R" are akyl, they may typically include methyl, ethyl, n-propyl, iso-propyl, n-butyl, iso-butyl, sec-butyl, t-butyl, n-amyl, iso-amyl, n-hexyl, n-heptyl n-octyl, n-decyl, etc.

When R' and R" are alkenyl, they may typically include vinyl, allyl, buten-1-yl, etc. When R' and R" are alkenyl, they may typically include ethynyl, propyn-1-yl, n-butyn-1-yl, etc. When R' and R" are cycloalkyl, they may include cyclohexyl, cycloheptyl, cyclooctyl, methyl cyclohexyl, etc. When R' and R" are aryl, they may typically include phenyl, naphthyl, etc. When R' and R" are aralkyl, they may typically include benzyl, w-phenylpropyl, etc. When R' and R" are alkaryl, they may typically incude tolyl, xylyl, etc.

Typical compounds R'R"SnO include dimethyltin oxide, diethyltin oxide, di-n-propyltin oxide, di-n-butyltin oxide, di-isopropyltin oxide, di-isobutyltin oxide, diphenyltin oxide, di-n-benzyltin oxide, di-n-octyltin oxide, di-n-hexyltin oxide, di-cyclohexyltin oxide, di-allyltin oxide, butyl propyltin oxide, etc.

The preferred compound R'R"SnO is that wherein R' and R" are the same. Preferably R' and R" are lower alkyl, i.e. alkyl groups having less than about 10 carbon atoms. The preferred compound is di-n-butyltin oxide.

The β-mercaptopropionic acid, $HSCH_2CH_2COOH$ (m. wt. 90) which is employed is commercially available. It is a clear liquid having a sp. Gr. of 1.218 (21/4° C.), M.P. 16.8° C., and B.P. 110.5° C.–111.5° C. at 15 mm. Hg.

According to a preferred embodiment of this invention, the R'R"SnO, preferably dibutyltin oxide, and β-mercaptopropionic acid are reacted in equimolar quantities as follows:

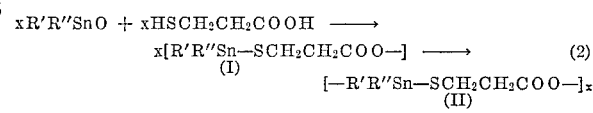

The R'R"SnO and the β-mercaptopropionic acid are added to a reaction mixture wherein they react to form by-product water. Optionally the reaction is conducted in the presence of an inert solvent, preferably one which forms an azeotrope with the by-product water. Preferred solvents include acetone, heptane, and aromatic hydrocarbon solvents including toluene and xylene. Preferably the solvent is present in amount sufficient to permit removal of the by-product water by azeotropic distillation. Typically 10–25, say 15 parts of solvent per 100 parts of product or about 2 to 5 parts of solvent per part of by-product water is present. The reactants may preferably be heated to reflux temperature typically 95° C.–135° C., say 100° C. during which time by-product water of reaction may be azeotropically distilled off.

Completion of the reaction, as measured by recovery of one mole of water per mole of R′R″SnO (if this compound is present in amount less than that of the acid present), is observed after 15–45 minutes, say 30 minutes. Remaining solvent may be removed by distillation under vacuum, typically at 10–50 mm. Hg pressure, say 25 mm. Hg over 15–45 minutes, say 30 minutes.

The product so produced may be recovered as residue in yield approaching 100%. Although this product, prepared preferably from equimolar amounts of the charge materials, may be thought of as having the indeterminate monomeric Formula I supra, it appears more likely that it has the semi-empirical Formula II supra. In this formula, it appears that $x$ may be an integer typically 3–8, say 5, i.e. that this many of the designated moieties may be linked together. Typically the product so formed may have a molecular weight as determined by melting point depression which indicates that 6–8 of these moieties may be joined together. This material may be found to be of limited solubility in organic solvents such as toluene.

In practice of the instant invention, there is added to the reaction mixture, prior to the recovery therefrom of said composition, 0.05–0.20 moles of $R_aSnCl_{b+1}$ per mole of β-mercaptopropionic acid. In the compound $$R_aSnCl_{b+1}$$

R may be selected from the group consisting of R′ and R″. R may be the same as R′ or R″, but it need not necessarily be the same. Preferably R may be butyl. $a$ may be less than 3, and $a+b$ may equal 3.

Typically the compound $R_aSnCl_{b+1}$ includes butyltin trichloride, phenyltin trichloride, propyltin trichloride, dibutyltin dichloride, diethyltin dichloride, diphenyltin dichloride, etc. The preferred compounds are the compound $R_2SnCl_2$ wherein R is lower alkyl, preferably butyl. The preferred compound is dibutyltin dichloride.

The compound $R_aSnCl_{b+1}$ may be added to the reaction mixture at the beginning of the reaction, i.e. simultaneously with the R′R″SnO and the β-mercaptopropionic acid, or during the course of the reaction, or preferably after the product, putatively polymeric material $[R'R''Sn-SCH_2CH_2-COO-]_x$, may be prepared. Thus, it may not be necessary to isolate the latter material prior to adding $R_aSnCl_{b+1}$ to the reaction mixture. Reaction of $R_aSnCl_{b+1}$ with the polymeric material or with the compounds from which it may be prepared may be as follows:

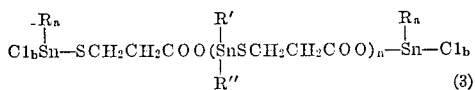

(3)

or alternatively

R′R″SnO + HSCH$_2$CH$_2$COOH + R$_a$SnCl$_{b+1}$ ⟶

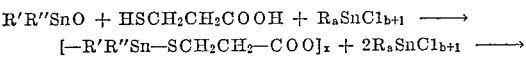

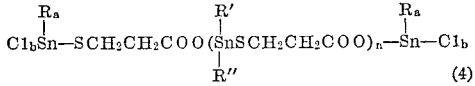

(4)

Equation 3 schematically illustrates the reaction which may occur when the compound $R_aSnCl_{b+1}$ is added before the polymer is recovered from the reaction mixture, e.g. at the beginning of the reaction. Equation 4 schematically illustrates the reaction which may occur when the compound $R_aSnCl_{b+1}$ is added after the polymer is formed. In reaction $3x=n+1$. These equations schematically illustrate that the three materials may react to form the disclosed compound which includes a chain containing tin and sulfur groups and which may be terminated by a residue from the $R_aSnCl_{b+1}$ compound.

The novel product of this reaction may be characterized by the above-noted formula which typically may have an analysis depending on the nature of R. When R is butyl (the product having been prepared, e.g. from $R_aSnCl_{b+1}$ wherein R is butyl, $a$ is 2, and $b$ is 1) the typical product has an analysis 34%–36%, say 35% Sn, 9%–9.5%, say 9.2% S, and 0.5%–3%, say 2.5% Cl. The linear product so formed may be readily soluble in toluene, in xylene, in benzene, in butylbenzene, in methyl butyl benzene, etc. Normally it may exist in the form of a free-flowing white crystalline powder, etc.

In accordance with a specific illustrative example of this invention which shows an illustrative technique for preparing a preferred embodiment of the novel composition of this invention, 42 parts by weight (0.4 moles) of β-mercaptopropionic acid, 100 parts by weight (0.4 moles) of dibutyltin oxide, 12 parts by weight (0.04 moles) of dibutyltin dichloride, and 800 parts by weight of benzene may be added to a reaction vessel fitted with stirrer, heating mantle, and Dean-Stark trap. This reaction mixture may be heated to reflux. During the reflux, 7.2 parts by weight (0.4 moles) of water may be recovered and separated which represents substantially 100% by weight of the theoretical recovery. The system may be adjusted to permit removal of the benzene and 800 parts may be recovered by distillation first at atmospheric pressure and then under vacuum of a water aspirator. The product may be recovered in substantially 100% yield as a white crystalline powder.

The novel resin compositions particularly characterized by their superior heat and light stability are prepared by mixing together a halogen-containing, preferably a chlorine-containing resin or organic polymer, and a stabilizing amount of a compound

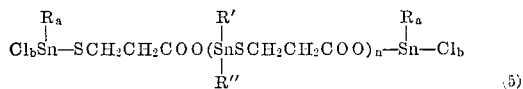

(5)

wherein R, R′, and R″ are each selected from the group consisting of alkyl, alkenyl, alkynyl, cycloalkyl, aryl, aralkyl, and alkaryl, $a$ is less than 3, and $a+b$ equals 3, and $n$ is 1–5, this compound having been prepared by the reaction of R′R″SnO, HSCH$_2$CH$_2$COOH, and R$_a$SnCl$_{b+1}$.

The polymers which are stabilized by practice of this invention are halogen-containing organic polymers typically those which contain chlorine atoms bonded to the polymer chain. These polymers are homopolymers including polyvinyl chloride-type polymers, e.g. polyvinyl chloride, polyvinylidene chloride, etc. They also include copolymers formed by the copolymerization of vinyl chloride and vinylidene chloride with each other and each with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. Typical such copolymers include vinyl chloride-vinylidene chloride copolymers, vinyl chloride-vinyl acetate copolymers, vinyl chloride-diethyl maleate copolymers, vinyl chloride-diethyl fumarate copolymers, vinylidene chloride-acrylonitrile copolymers, vinylidene chloride-vinyl acetate copolymers, vinylidene chloride-styrene copolymers, vinylidene chloride-acrylate copolymers, and vinylidene chloride-butadiene copolymers. For convenience, reference will be hereinafter made to vinyl chloride polymers.

The vinyl chloride polymers may also contain plasticizers such as dioctyl phthalate; lubricating agents such as stearic acid; pigments; fillers; etc.

Stabilizing amounts of the novel compositions of this invention are 0.25 to 10, preferably 1 to 3, say 2 parts by weight of composition per 100 parts by weight of polymer, e.g. vinyl chloride polymer. Thus the preferred heat and light stable vinyl chloride polymer compositions of this invention comprise 100 parts by weight of a vinyl chloride polymer and a stabilizing amount, typically 1 to 3 parts, of the compound of Formula 5 supra.

The novel heat and light stable compositions of this invention may be formulated by such techniques as milling, dry blending, Banbury blending, or any other commonly employed formulating techniques.

In order to point up the novel features of this invention and to illustrate the unexpected and superior results obtained by the practice thereof, the following illustrative comparative examples were run.

In a control (I) a reaction, 543 parts by weight (2.22 moles) of dibutyltin oxide, 234 parts by weight (2.21 moles) of β-mercaptopropionic acid, and 300 parts by weight of acetone were mixed together and refluxed at 59° C. for 55 minutes. The reaction mixture was then cooled and filtered, the filtrate being saved for recovery of acetone. The filter cake was vacuum dried to yield a crystalline white product in substantially stoichiometric (100%) yield. The product exhibited an analysis of 34.8% Sn and 9.4% S, and a melting point of 111° C.–130° C. This material was used as standard.

In a second (II) reaction conducted in accordance with this invention, 5 parts by weight of dibutyltin dichloride were mixed with 100 parts by weight of the above-noted control product (I) and reaction may be effected by grinding the reactants together and heating slightly.

In a third (III) reaction conducted in accordance with this invention, 10 parts by weight of dibutyltin dichloride were mixed with 100 parts by weight of the control product (I) and reaction effected by grinding the reactants together and heating slightly.

Each of these three comparative compositions was blended with separate aliquots of vinyl chloride polymer having a specific gravity of 1.40, a Shore Durometer D hardness of 80, and an ultimate tensile strength of 7000 p.s.i.g., sold under the trademark Geon 103–EP. In each case, 100 parts of vinyl chloride polymer were blended with 2 parts of the composition.

These compositions were thoroughly blended by placing the polyvinyl chloride on a two-roller differential mill which was oil-heated to a temperature of 163° C.–177° C. together with the hereinafter noted quantity of stabilizer and the mixture milled for about 5 minutes. A continuous band of the composition formed around one of the rollers. This band was cut and the composition was removed from the hot roller as a continuous sheet. Squares of this material measuring 2.54 cm. x 2.54 cm. were cut for heat stability testing.

Samples for light stability testing were prepared by press-polishing 15 cm. x 15 cm. squares cut from the milled sheet. Press-polishing was carried out by compressing the squares between chrome-surfaced plates at 177° C. and 25–30,000 p.s.i. for 3 minutes. Samples of each of the compositions were tested for light stability in an Atlas Fadeometer by exposure therein for a total of 1300 hours. These samples were inspected at various intervals and were rated visually as to color change and degradation according to the following scale:

7—no change
6—slightest discernible change
5—slight change
4—moderate change
3—burn line
2—severe spotting or overall discoloration The results of the light stability tests are presented in Table I.

TABLE I.—LIGHT STABILITY

| | Initial discoloration, hour | 300 hr. | 360 hr. | 400 hr. | 500 hr. | 520 hr. | 700 hr. |
|---|---|---|---|---|---|---|---|
| I | 140 | 4 | (¹) | | | | |
| II | 220 | 5+ | | | 5 | 4+ | (¹) |
| III | 400 | 7 | | | 6 | 5 | 5 | (¹) |

¹ Discontinued.

It will be apparent from Table I that the vinyl chloride resin stabilized with the standard became quickly discolored after only 140 hours of test and that after 300 hours the rating had dropped to 4. In contrast, the first experimental sample (II) gave an initial discoloration after 220 hours and was satisfactory to about 520 hours, this representing an improvement by a factor of almost two; the second experimental sample (III) gave an initial discoloration after 400 hours and even after 700 hours the resin was still not undesirably discolored, this representing an unexpected improvement by a factor of two-to-three.

The heat stability of the novel product of this invention was tested by placing 2.54 cm. squares in an oven regulated to maintain a temperature of 190° C. Samples of each composition were removed from the oven at 15 minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less may be recorded as the "Heat Stability Value."

The Heat Stability Value of each of the three compositions tested was found to be 60 minutes, which is satisfactory.

It is completely unexpected that the above-tested specimens embodying the novel stabilizers of this invention posses such superior ability to effect stabilization against deterioration by light while simultaneously retaining the ability to effect stabilization against deterioration by heat.

Other examples of stabilized vinyl chloride polymer resin compositions which fall within the scope of this invention and possess unexpectedly superior properties with respect to heat and light stability will be obvious to those skilled in the art. Although this invention has been illustrated by reference to specific examples, changes therein which clearly fall within the scope of the invention will be apparent to those skilled in the art. It is therefore to be limited solely by the scope of the appended claims.

I claim:
1. A novel heat and light stable halogen-containing organic polymer composition comprising a halogen-containing polymer selected from the group consisting of homopolymers of vinyl chloride or vinylidene chloride, and copolymers of vinyl chloride and vinylidene chloride with each other or with other ethylenically unsaturated monomers and a stabilizing composition prepared by the reaction of $R_aSnCl_{b+1}$ with substantially equimolar amounts of R'R''SnO and $HSCH_2CH_2COOH$, wherein R, R' and R'' are each selected from the group consisting of alkyl, alkenyl, alkynyl, cycloalkyl, aryl, aralkyl, and alkaryl, $a$ is less than 3, and $a+b$ equals 3.

2. A novel heat and light stable halogen-containing organic polymer composition comprising a halogen-containing polymer selected from the group consisting of homopolymers of vinyl chloride or vinylidene chloride, and copolymers of vinyl chloride and vinylidene chloride with each other or with other ethylenically unsaturated monomers and a stabilizing composition prepared by the reaction of R'R''SnO, $HSCH_2CH_2COOH$, and $R_aSnCl_{b+1}$, wherein R, R', and R'' are lower alkyl, $a$ is less than 3, and $a+b$ equals 3, said $R_aSnCl_{b+1}$ being present in amount of 0.05–0.20 mole per mole of $HSCH_2CH_2COOH$ and said R'R''SnO and said $HSCH_2CH_2COOH$ being present in substantially equimolar amounts.

3. A novel heat and light stable halogen-containing organic polymer composition comprising 100 parts of a halogen-containing polymer selected from the group consisting of homopolymers of vinyl chloride or vinylidene chloride, and copolymers of vinyl chloride and vinylidene chloride with each other or with other ethylenically unsaturated monomers and 0.25–10 parts of a stabilizing composition prepared by the reaction of R'R''SnO, $HSCH_2CH_2COOH$, and $R_aSnCl_{b+1}$, wherein R, R', and R'' are each selected from the group consisting of alkyl, alkenyl, alkynyl, cycloalkyl, aryl, aralkyl, and alkaryl, $a$ is less than 3, and $a+b$ equals 3, said $R_aSnCl_{b+1}$ being present in amount of 0.05–0.20 mole per mole of $HSCH_2CH_2COOH$ and said R'R''SnO and said $$HSCH_2CH_2COOH$$

being present in substantially equimolar amounts.

4. A novel heat and light stable halogen-containing organic polymer composition comprising a halogen-containing polymer selected from the group consisting of homopolymers of vinyl chloride or vinylidene chloride, and copolymers of vinyl chloride and vinylidene chloride with each other or with other ethylenically unsaturated monomers and a stabilizing composition prepared by the reaction of R'R''SnO, $HSCH_2CH_2COOH$, and $R_aSnCl_{b+1}$, wherein R, R', and R'' are butyl, $a$ is less than 3, and $a+b$ equals 3, said $R_aSnCl_{b+1}$ being present in amount of 0.05–0.20 mole per mole of $HSCH_2CH_2COOH$ and said R'R''SnO and said $HSCH_2CH_2COOH$ being present in substantially equimolar amounts.

References Cited

UNITED STATES PATENTS 3,293,273   12/1966   Gloskey _____ 260—45.75

DONALD E. CZAJA, Primary Examiner
V. P. HOKE, Assistant Examiner